UNITED STATES PATENT OFFICE.

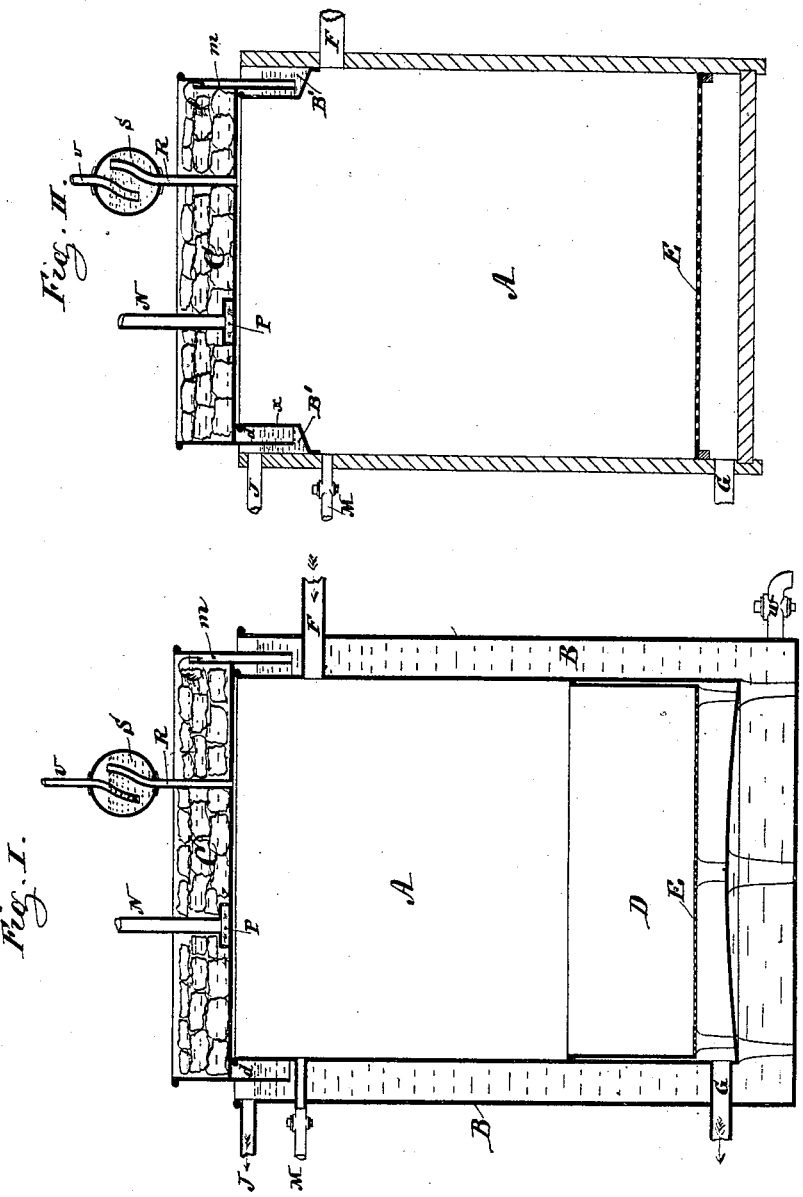

JEAN SCHAFHAUS, OF NEW YORK, N. Y.

SEPARATING-TUN OR HOP-BACK.

SPECIFICATION forming part of Letters Patent No. 262,622, dated August 15, 1882.

Application filed April 15, 1882. (No model.)

*To all whom it may concern:*

Be it known that I, JEAN SCHAFHAUS, a citizen of the United States, residing in New York, in the State of New York, have invented a new and useful Improvement in Separating-Tuns or Hop-Backs, of which the following is a specification.

In the accompanying drawings, Figure I represents a vertical section of a hop-back embodying my improvements. Fig. II is a modification of the same.

Similar letters represent similar parts.

During the operation of brewing beer, when the boiling of the "wort" is finished the hopped wort is drawn off into another tun, called a "hop-back," (hop-vessel,) which has a perforated bottom or strainer for the purpose of retaining the hops, malt, and other substances and to draw off the clear wort or beer. These tuns or hop-backs are generally open vessels, and will allow the steam or vapors to escape freely at the top, and thus fill the room with their escaping steam.

The object of my invention is to confine and at the same time nearly condense all the steam, and retain thereby part of the flavor or aroma which at present escapes with the steam or vapor.

In the accompanying drawings, A is a hop-back, into which the wort is drawn from the brew-kettle through the pipe F, provided with a strainer, E, near the bottom, and an outlet-pipe, G, through which the cleared and strained beer is drawn off. This tun or hop-back A is placed in a vessel, B, of sufficient size to allow a space for water all around said tun A as well as against the bottom.

Upon the tun A a tank, C, is placed, open at top and resting upon the top of the tun. The sides of this tank C project some distance below the bottom of said tank and enter into the space between the outside of the tun A and the inner sides of the vessel B, as shown at *d*, and form thus, when the vessel B is filled with water, a water-joint and vapor-tight cover for the tun A.

To the inside, upon the bottom of the tank C, a channel-way, P, is attached, having perforated sides for the escape of water over this bottom surface, the water being supplied to this channel-way P through the pipe N. At one or more places of the circumference overflow-pipes *m* are arranged to carry the surplus water from the tank C into the water-space between the tun A and vessel B.

To prevent all danger from any increase of pressure in the inside of the tun A during the operation, a pipe, R, is attached to the bottom of the tank C, passing into a close vessel, S. On the top of this vessel S a pipe, *v*, is arranged, extending into the same nearly to its bottom. This vessel S is filled with water, forming thus a water-joint or water safety-valve.

At the upper end of the vessel B an overflow-pipe, J, is arranged, and near the bottom a cock, *w*, to draw off the water when required, as well as the usual suitable hand-holes for cleaning the interior of the vessel B.

The boiled wort runs from the brew-boiler, through the pipe F, into the tun A, where the strainer E retains the hops, malt, and other parts, and the beer is carried away through the pipe G. The steam and vapors of the wort in the tun A are condensed again, the sides of the said tun and the bottom of the tank C forming the cover of said tun A. To lower the temperature of the water supplied to the tank C and then made to surround the tun A, ice may be placed into the tank C. By this arrangement the escape of steam and vapors from the tun A while the process of filtering the wort is progressing will be prevented.

Instead of arranging the strainer E near the bottom of the tun, I arrange a vessel, D, fitting close into the inside of the tun and supporting the same by suitable legs or projections at the proper distance from the bottom of the tun, and perforate its bottom to form the strainer E. By this arrangement the hops, malt, &c., retained above the strainer E will be collected in said vessel D, and are then easily removed out of the tun A by the lifting out of this vessel D.

To alter any existing tun and arrange my improved cooling-cover to the same, a water trough or channel, B', (see Fig. II,) can be arranged in the upper part of said tun, upon which the cover C, constructed and arranged as above described, is supported, with its lower projecting part, *d*, entering the water supplied to said trough or channel, to make this cover vapor-tight, as above set forth.

Near the top of the tun A a pipe, M, provided with a stop-cock, is arranged for the purpose of injecting water into the tun A to assist condensing the steam or vapors during the operation, if desired.

The above-described construction of my improved hop-back not only condenses the steam and vapors in the vessel and retains the flavor or aroma in the beer, but at the same time lowers considerably the temperature of the beer during this process of filtering the same or of separating the beer from the hops, malt, &c., and thereby facilitates and expedites the after process of cooling the beer in the manner generally adopted.

What I claim as my invention, and desire to secure by Letters Patent, is—

In a hop-back, the tun A, provided with outlet and inlet pipes, and a strainer, E, above the outlet-pipe, in combination with vessel B, having suitable overflow and outlet pipes, tank C, constructed as described, whereby it forms a cover for said tun, provided with channel-way P, located in the bottom of said tank, having perforated sides, and pipe N, overflow-pipes $m$, attached to tank C and arranged to carry surplus water into the space between tun A and vessel B, and the pipes R $v$ and vessel S, acting as a water safety-valve to prevent danger of any increase of pressure in said tun, substantially as set forth.

JEAN SCHAFHAUS.

Witnesses:
HENRY E. ROEDER,
I. G. PENNYBRICK.